Feb. 16, 1960   J. W. WALKER   2,925,109
ADJUSTABLE RANGE QUICK ACTION CAM CLAMP
Filed March 13, 1959
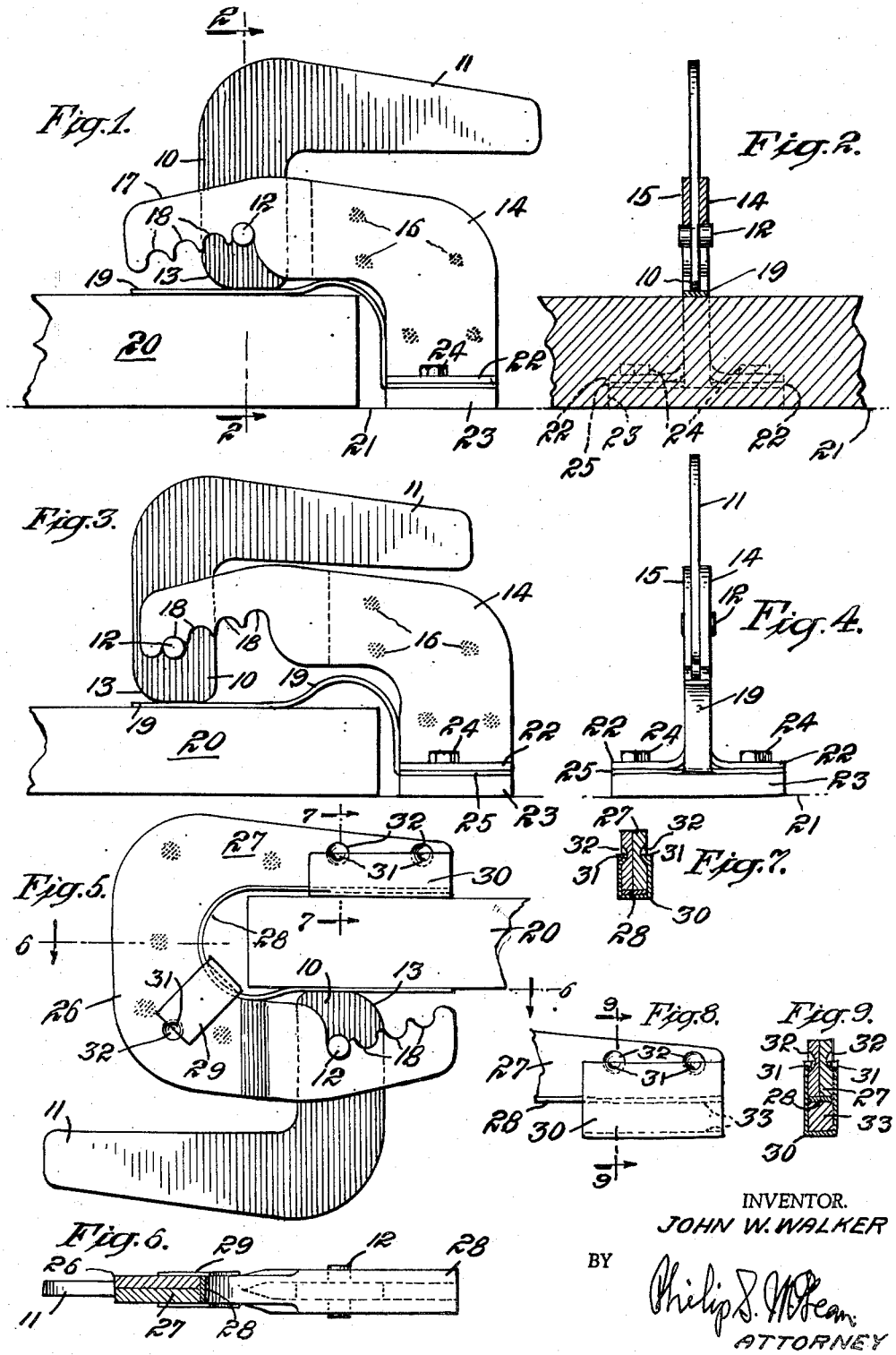
INVENTOR.
JOHN W. WALKER
BY
*Philip S. McBean*
ATTORNEY

United States Patent Office 2,925,109
Patented Feb. 16, 1960

2,925,109

ADJUSTABLE RANGE QUICK ACTION CAM CLAMP

John W. Walker, Wichita, Kans.

Application March 13, 1959, Serial No. 799,268

2 Claims. (Cl. 144—302)

The invention herein disclosed relates to clamps of the cam closing type and the objects of the invention are to provide a light but strong, simple, inexpensive reliable clamp of this type which will be adjustable to different ranges of holding action.

Further special objects of the invention are to provide a holding clamp of small flat construction which can be used in confined, restricted places and which can be readily operated in such places.

Other special objects of the invention are to provide a cam clamp of the type indicated, consisting of but few parts and which will be so constructed as to prevent the closing cam from leaving any mark on the parts held by the clamp.

The foregoing and other desirable objects have been attained by a novel form of construction in which the clamping jaw of the device is in the form of a cam lever pivotally supported in any one of a series of bearing openings located at different distances from the companion jaw and is releasably held in the selected bearing opening by a flat spring overlying the eccentric face of the cam lever and serving as the element gripping and holding the work.

Other desirable objects and novel features of the invention are set forth and will appear in the course of the following specification.

The drawing accompanying and forming part of the specification illustrates present practical embodiments of the invention but structure may be further modified and changed as regards such illustration, all within the true intent and scope of the invention as hereinafter defined and claimed.

Fig. 1 is a side elevation of one of the clamps designed for mounting on a jig or table, bench or other support, showing it closed upon a work piece, the latter broken away.

Fig. 2 is a vertical sectional view as on substantially the plane of line 2—2 of Fig. 1.

Fig. 3 is a side view similar to Fig. 1, showing the clamp adjusted to and closed upon a smaller piece of work.

Fig. 4 is a front elevation of the clamp.

Fig. 5 is a side view of the invention in a C-clamp form.

Fig. 6 is a sectional view on substantially the plane of line 6—6 of Fig. 5.

Fig. 7 is a sectional view on substantially the plane of line 7—7 of Fig. 5 showing the detachable clip for holding the retaining spring in place.

Figs. 8 and 9 are detail views illustrating a modification of the clip used for holding a spacer piece in place, Fig. 9 appearing as on section line 9—9 of Fig. 8.

In all forms the clamp is made up of companion jaws spaced to receive the work between them and a cam lever which can be shifted to different bearing notches in one of the jaws and a flat spring for retaining the cam lever in the selected bearing notches.

The cam lever is shown as a flat sheet metal piece having angularly related cam and handle portions 10, 11, with a fulcrum pin 12 extending through the cam portion, eccentrically related to the curved cam edge 13.

The fixed jaw which forms the support for the cam lever is shown as made up of a pair of flat plates 14, 15 secured together in flat engagement at the back by welding or other means 16 and spaced apart at the front at 17 to receive the cam portion of the lever.

These spaced apart portions of the frame forming plates 14, 15 are provided at their under or inner edges with a series of bearing notches 18 to receive the protruding ends of the fulcrum pin 12.

These bearing notches, as shown in Fig. 1, have their centers arranged on an incline, thus locating the individual notches at different distances from the other jaw or holding portion of the clamp.

A flat spring strip 19 bearing against the cam edge of the lever holds the lever in place in different notches and serves as a guard over the work piece 20 protecting it against scratching or marring by the cam lever.

In the first illustrated embodiment the clamp is made for mounting on a bench, table or other supporting structure represented by line 21, so the side plates 14, 15 have outwardly angled base extensions 22 and an underlying base plate 23 which can be bolted down on the bench or other support as indicated at 24.

In this construction the lever holding spring 19 may be secured in place by having a base portion 25 at the back extended in between the base flanges 22 of the side plates and the base plate 23.

The construction described has the advantage of simplicity, consisting as it does of just the one support for the movable clamping jaw and utilizing the bench or other stationary support as the companion jaw of the clamp.

In Figs. 5 and 6 the invention is shown made up as a C-clamp in which the side plates forming the frame are of complete C formation 26 welded or otherwise secured together at the back and at the stationary jaw forming portions 27.

The structure otherwise is generally the same except that the cam lever holding spring is a U-shaped spring strip 28 entered between the fixed jaw portions of the clamp in position to bear at one side against the cam nose of the clamp lever.

Additionally the U-bent spring may be held in place between the jaws by one or more clips such as the U-shaped spring clip 29 engaged over the bight portion of the spring and end clip 30 engaged over the end portion of the spring.

Both these clips are shown held in place by having indented edge portions 31 sprung into appropriately located recesses 32 in the sides of the frame plates.

To further extend the holding range of the clamp a spacer or filler piece 33 may be held over the fixed jaw by end clip 30, as shown in Figs. 8 and 9, the latter in such case being extended or lengthened to contain such filler.

The portable form of the device is particularly light and thin, as shown in Figs. 5 and 6, and suitable for use in limited spaces. All forms of the invention consist of few simple, strong but inexpensive parts. The spring 19 or 23 holds the cam lever in place in the frame, retains the lever in place while it is being shifted from one notch to another and forms a flexible member gripping the work and saving the parts being held against abrasion or other injury from the cam. This spring, while ordinarily holding the cam in place, may be deflected at any time sufficiently to permit removal of the cam lever from the clamp frame.

The cam clamp has many uses and may be used with many forms of supports.

For example, the portable C-clamp form of the invention may be held in a vise and the jaws of the vise used as a stationary jaw opposed to the cam lever.

What is claimed is:

1. A cam clamp comprising opposed clamp jaws, one of said clamp jaws consisting of a pair of similar flat frame plates secured together in face to face parallel relation with space between the same and having spaced apart edges with pairs of aligned bearing notches therein, a cam lever having a cam portion disposed in the space between said frame plates and a fulcrum pin projecting from opposite sides of said cam portion and engageable at its opposite ends in aligned bearing notches and a flat spring disposed between said opposed clamp jaws and extending over said bearing notches in the edges of said frame plates and bearing on the inner end of said cam portion and yieldingly holding said cam lever with said fulcrum pin engaged in selected pairs of bearing notches and whereby said flat spring in any position of the cam lever in said notches is forced by said cam lever into gripping engagement with objects held by the cam lever between said opposed clamp jaws.

2. The invention according to claim 1 in which said frame plates are of C-shaped formation providing opposed clamp jaws and in which said spring is of corresponding C-formation releasably engaged with the frame plates between the opposed jaws thereof.

References Cited in the file of this patent

UNITED STATES PATENTS

| | | |
|---|---|---|
| 630,900 | Kohl | Aug. 15, 1899 |
| 1,085,353 | Miller | Jan. 27, 1914 |
| 1,191,905 | Maynard | July 18, 1916 |
| 1,490,063 | Tower | Apr. 8, 1924 |

FOREIGN PATENTS

| | | |
|---|---|---|
| 458,301 | Great Britain | Dec. 16, 1936 |